United States Patent [19]

Kimura

[11] Patent Number: 4,906,979
[45] Date of Patent: Mar. 6, 1990

[54] MONITORING SYSTEM WITH MICROPROCESSOR AND WATCHDOG CIRCUIT MONITORING EACH OTHER

[75] Inventor: Kozo Kimura, Nara, Japan

[73] Assignee: Sharp Kabushiki Kaisha, Osaka, Japan

[21] Appl. No.: 169,390

[22] Filed: Mar. 17, 1988

[30] Foreign Application Priority Data

Mar. 18, 1987 [JP] Japan .................................. 62-65164

[51] Int. Cl.$^4$ ............................................ G08B 13/14
[52] U.S. Cl. .................................... 340/658; 340/505; 340/516; 340/825.16; 364/185; 324/535
[58] Field of Search .................... 340/516, 523, 825.36, 340/505, 522, 630, 628, 658, 825.06, 825.16, 825.17; 324/532, 533, 535; 364/185; 375/3.1

[56] References Cited

U.S. PATENT DOCUMENTS

| | | | |
|---|---|---|---|
| 3,753,086 | 8/1973 | Shoemaker, Jr. .................. | 324/533 |
| 3,838,419 | 9/1974 | McSorley et al. .................. | 340/505 |
| 4,187,415 | 2/1980 | Boutmy et al. ...................... | 375/3.1 |
| 4,456,906 | 6/1984 | Roach, Jr. ............................ | 340/516 |
| 4,482,895 | 11/1984 | Weinberg ........................ | 340/825.36 |
| 4,581,700 | 4/1986 | Farnham et al. .................... | 364/185 |
| 4,593,273 | 6/1986 | Narcisse ............................... | 340/505 |
| 4,749,871 | 6/1988 | Galvin et al. ........................ | 340/630 |

Primary Examiner—Joseph A. Orsino
Assistant Examiner—Jill D. Jackson
Attorney, Agent, or Firm—Flehr, Hohbach, Test, Albritton & Herbert

[57] ABSTRACT

A monitoring system for an electronic instrument includes within itself a microprocessor and a watchdog circuit each provided with its own oscillator which generates a clock pulse and operating on the basis of this clock pulse. The watchdog circuit transmits a periodic interrupt pulse to the microprocessor which transmits a response pulse to the watchdog circuit in return. The watchdog circuit monitors the operation of the microprocessor by measuring the phase difference between the interrupt and response pulses and the microprocessor monitors the operation of the watchdog circuit by measuring the period of the interrupt pulse.

5 Claims, 1 Drawing Sheet

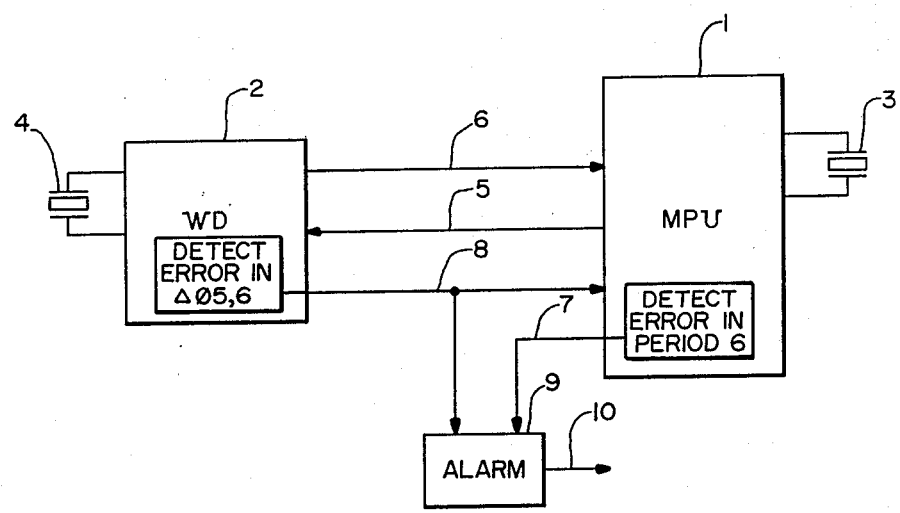
FIG.—1
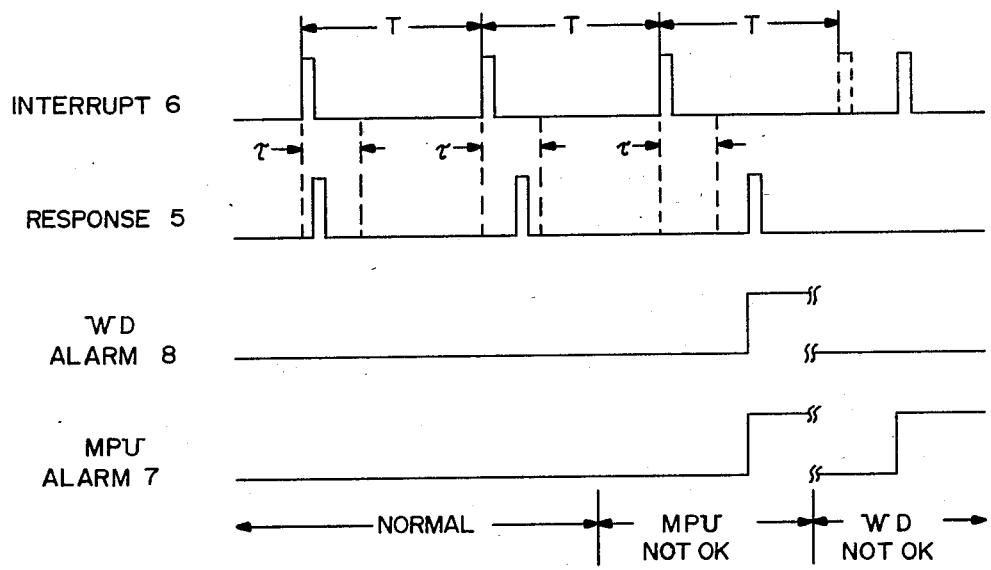
FIG.—2 a watchdog circuit each monitoring the operation of the other and is so structured that the watchdog circuit not only includes a first pulse generator circuit which generates a first clock pulse and transmits an interrupt pulse with a fixed period to the main control circuit on the basis of the generated first clock pulse but also measures the phase shift between this interrupt pulse and a response pulse received from the main control circuit and generates a first warning signal if this measured phase shift is greater than a predetermined value. In addition, the main control circuit not only includes separately a second pulse generator circuit which generates a second clock pulse and transmits to the watchdog circuit a response pulse with a fixed period in response to a second clock pulse generated in response to an interrupt pulse received from the watchdog circuit but also measures the period of the interrupt pulse transmitted from the watchdog circuit and to generate a second warning signal if this measured period exceeds a predetermined period value. An alarm is outputted in response to either of the warning signals.

MONITORING SYSTEM WITH MICROPROCESSOR AND WATCHDOG CIRCUIT MONITORING EACH OTHER

BACKGROUND OF THE INVENTION

This invention relates to a monitoring system for an electronic instrument and more particularly to a monitoring system for an electronic instrument including within itself a microprocessor (MPU) and a watchdog (WD) circuit each adapted to monitor the operations of the other.

Electronic instruments of which safety and high reliability are required must be able to detect a malfunction or a runaway condition of their main control circuit and stop the operation under a safe condition. For this reason, a so-called watchdog circuit is sometimes incorporated for monitoring the operation of the main control circuit from outside such that an abnormal condition can be detected and an alarm circuit is provided to output a warning signal or stop the operation of the instrument under a safe condition in response to an output from the watchdog circuit.

Although watchdog circuits of different types have been proposed, let us consider as an example for the purpose of explanation an instrument having a microprocessor in its main control circuit. In a typical conventional monitoring system, the microprocessor outputs a periodic check pulse to a watchdog circuit to show its condition of operation and the watchdog circuit receives and analyzes this pulse to conclude that the microprocessor is operating normally. If there is an occurrence of abnormality in the microprocessor, it ceases to operate normally and the check pulse transmitted therefrom to the watchdog circuit becomes irregular or may even stop completely. This is how the watchdog circuit comes to detect an abnormal condition in the microprocessor.

Such a watchdog circuit, however, is no more than a unidirectional monitoring device which makes use of a unidirectional signal from the microprocessor to itself. Since such a unidirectional monitoring system becomes unable to detect an abnormal condition in the microprocessor if its own watchdog circuit ceases to operate normally, bi-directional monitoring systems have come to be considered in order to improve monitoring capability. In a bi-directional monitoring system, not only does the watchdog circuit monitor the microprocessor but also the microprocessor monitors the operation of the watchdog circuit, both outputting a check pulse signal to the other to check whether the other is operating normally. Thus, if an abnormal condition occurs either in the microprocessor or in the watchdog circuit, it can be detected by the other in such a system. Prior art bi-directional monitoring systems are adapted to check merely whether or not check pulses are being received, however, and are not capable of high-precision monitoring.

SUMMARY OF THE INVENTION

It is therefore an object of the present invention to provide a monitoring system for an electronic instrument with which its main control circuit and its watchdog circuit can each monitor the operation of the other with high precision.

The above and other objects of the present invention are achieved by providing a monitoring system for an electronic instrument which has a main control circuit and In summary, the main control circuit measures the period of the interrupt pulse while the watchdog circuit measures the phase difference between the response pulse and the interrupt pulse and an alarm is outputted if either of the measured value exceeds a predetermined value. Thus, each can ascertain whether the other is operating normally or not, and the operation of the apparatus can be monitored much more accurately than by the primitive method of merely detecting whether the check pulse is present or not.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a block diagram of an apparatus embodying the present invention, and

FIG. 2 is a timing chart of the operation of the monitoring system shown in FIG. 1.

DETAILED DESCRIPTION OF THE INVENTION

As shown in FIG. 1, an electronic apparatus embodying the present invention includes a microprocessor MPU 1, a watchdog (WD) circuit 2 and an alarm circuit 9. The microprocessor 1 is provided with an oscillator 3, and is adapted not only to operate according to a first clock pulse generated by this oscillator 3 but also to transmit to the watchdog circuit 2 a response pulse 5, if an interrupt 6 is received from the watchdog circuit 2, in response to this interrupt pulse 6 according to the first clock pulse generated by the oscillator 3 after a time period. The microprocessor is also adapted to measure the period of the interrupt pulse 6 and to generate a warning signal 7 and transmit it to the alarm circuit 9 if this measured period exceeds a predetermined value.

Connected to the watchdog circuit 2 separately is another oscillator 4 which generates a second clock pulse, and the watchdog circuit 2 is adapted to transmit to the microprocessor 1 an interrupt pulse 6 of a fixed period on the basis of the second clock pulse generated by the oscillator 4. The watchdog circuit 2 is further adapted to measure the phase difference between the interrupt pulse 6 and the response pulse 5 and to generate a warning signal 8 if this measured phase difference exceeds a threshold value and transmits it to the microprocessor 1 and to the alarm circuit 9. The microprocessor 1 is adapted to stop its operation under a safe condition if the warning signal 8 is received from the watchdog circuit 2. The alarm circuit 9 is adapted to output an alarm signal 10 if it receives the warning signal 7 from the microprocessor 1 or the warning signal 8 from the watchdog circuit 2.

Next, both the block diagram of FIG. 1 and the timing chart of FIG. 2 are referenced together for explaining the operation of a system of the present invention. As shown in FIG. 2, the watchdog circuit 2 transmits to the microprocessor 1 the interrupt pulse 6 of a fixed period T on the basis of the second clock pulse generated by the oscillator 4. The microprocessor 1 checks whether the watchdog circuit 2 is operating normally or not by being interrupted by this interrupt pulse 6 and measuring the interval of this interrupt, that is, by examining the periodicity of the interrupt pulse 6. For example, T is set equal to 64 msec and the microprocessor 1 is programmed to determine whether there is a phase difference of ±2.3% or not with respect to the period T and to conclude whether the watchdog circuit 2 is operating normally or not. When the interrupt pulse 6 is received, the microprocessor 1 transmits a response pulse 5 as shown in FIG. 2 to the watchdog circuit 2 within a fixed time interval $\tau$ (such as 16 msec) of the reception of the interrupt pulse 6.

If the watchdog circuit 2 detects that the delay between the interrupt pulse 6 and the response pulse 5 is less than $\tau$ it concludes that the microprocessor 1 is operating normally. If an abnormal condition occurs in the microprocessor 1 and the delay exceeds $\tau$ or the response pulse 5 ceases to be received, on the other hand, it is concluded that the microprocessor 1 is no longer operating normally. In other words, the watchdog circuit 2 keeps monitoring the phase difference between the interrupt pulse 6 and the response pulse 5 and concludes that an abnormal condition exists in the microprocessor 1 if a response pulse 5 is detected outside the time interval of $\tau$ even though a response pulse 5 is also detected within the normally expected time interval of $\tau$ because the watchdog circuit 2 is programmed to monitor the periodicity of the response pulse 5.

When the watchdog circuit 2 concludes that the microprocessor 1 is operating abnormally, a warning signal 8 is transmitted both to the microprocessor 1 and to the alarm circuit 9. When microprocessor 1 detects an abnormal condition in the watchdog circuit 2 or receives the warning signal 8 from the watchdog circuit 2, it transmits a warning signal 7 to the alarm circuit 9.

According to a preferred embodiment of the present invention, the system is so programmed that after a situation arises wherein a warning signal has once transmitted either from the microprocessor 1 or the watchdog circuit 2, the system cannot be released automatically from this situation. This is because an abnormal condition, even if it is due to a minor cause of a transitory nature so as not to affect the functions of the electronic apparatus, may develop into a more serious defect and an alarm, once outputted, should be allowed to continue. If the abnormality is in the microprocessor 1, in particular, there is the danger of a totally unexpected kind of malfunctions, depending on the part where the abnormality has occurred. Thus, if the microprocessor 1 is provided with means for automatically cancelling the warning, it may fail to output an alarm when it is needed. If the user wishes to release the situation, therefore, power must be disconnected from the instrument. The alarm circuit 9 is adapted to activate an alarm and also to stop the instrument in a safe condition if the warning signal 7 from the microprocessor 1 or the warning signal 8 from the watchdog circuit 2 is received.

In summary, the microprocessor 1 and the watchdog circuit 2 are respectively provided with the oscillators 3 and 4 and they can each measure the condition of the pulse from the other accurately on the time axis. In other words, the period or the interval of the received pulse can be measured on the basis of its own clock pulse. Thus, a condition of abnormality is determined not merely by the rough criterion of whether a pulse exists or not but also in terms of deviation from a standard value. If the microprocessor 1 and the watchdog circuit 2 were operated on the same pulse from one clock source, the microprocessor 1 would begin to operate abnormally and the response pulse 5 would become irregular when an abnormality occurs in the clock source but since this abnormality in the clock source would also affect the watchdog circuit 2, neither would be able to detect the abnormal condition of the other. According to the present invention, by contrast, since two oscillators 3 and 4 are separately provided to the microprocessor 1 and the watchdog circuit 2, an abnormal condition in the clock pulse of one can be immediately detected by the other. Moreover, since the microprocessor 1 is adapted to measure the periodic characteristics of the interrupt pulse 6 from the watchdog circuit 2 and the watchdog circuit 2 is adapted to measure the phase difference between the response pulse 5 from the microprocessor 1 and the interrupt pulse 6, each can accurately determine whether the other is operating normally or not.

What is claimed is:

1. In a monitoring system for an electronic instrument containing a main control circuit and a watchdog circuit each monitoring the operation of the other, the improvement wherein
   said watchdog circuit includes a first pulse generating circuit generating a first clock pulse and transmits to said main control circuit a periodic interrupt pulse whose period is determined by said first clock pulse,
   said main control circuit includes a second pulse generating circuit generating a second clock pulse, said second pulse generating circuit being independent of said first pulse generating circuit,
   where in response to said interrupt pulse, said main control circuit transmits to said watchdog circuit a response pulse after a time period that is determined by said second pulse,
   said watchdog circuit measures the phase difference between said response pulse received from said main control circuit and said interrupt pulse and transmits a first warning signal if said phase difference exceeds a predetermined first value, and
   said main control circuit measures the period of said interrupt pulse and transmits a second warning signal if said measured period exceeds a predetermined second value.

2. The monitoring system of claim 1 wherein said system further includes an alarm circuit for activating an alarm in response to said first or second warning signal.

3. The monitoring system of claim 2 wherein said first warning signal is transmitted to said alarm circuit.

4. The monitoring system of claim 2 wherein said second warning signal is transmitted to said alarm circuit.

5. The monitoring system of claim 3 wherein said first warning signal is transmitted also to said main control circuit.

* * * * *